Jan. 5, 1965 W. McCOLL 3,164,364
DEFORMABLE VALVE HEAD AND SEAT CONSTRUCTION
Filed Oct. 4, 1962 2 Sheets-Sheet 1
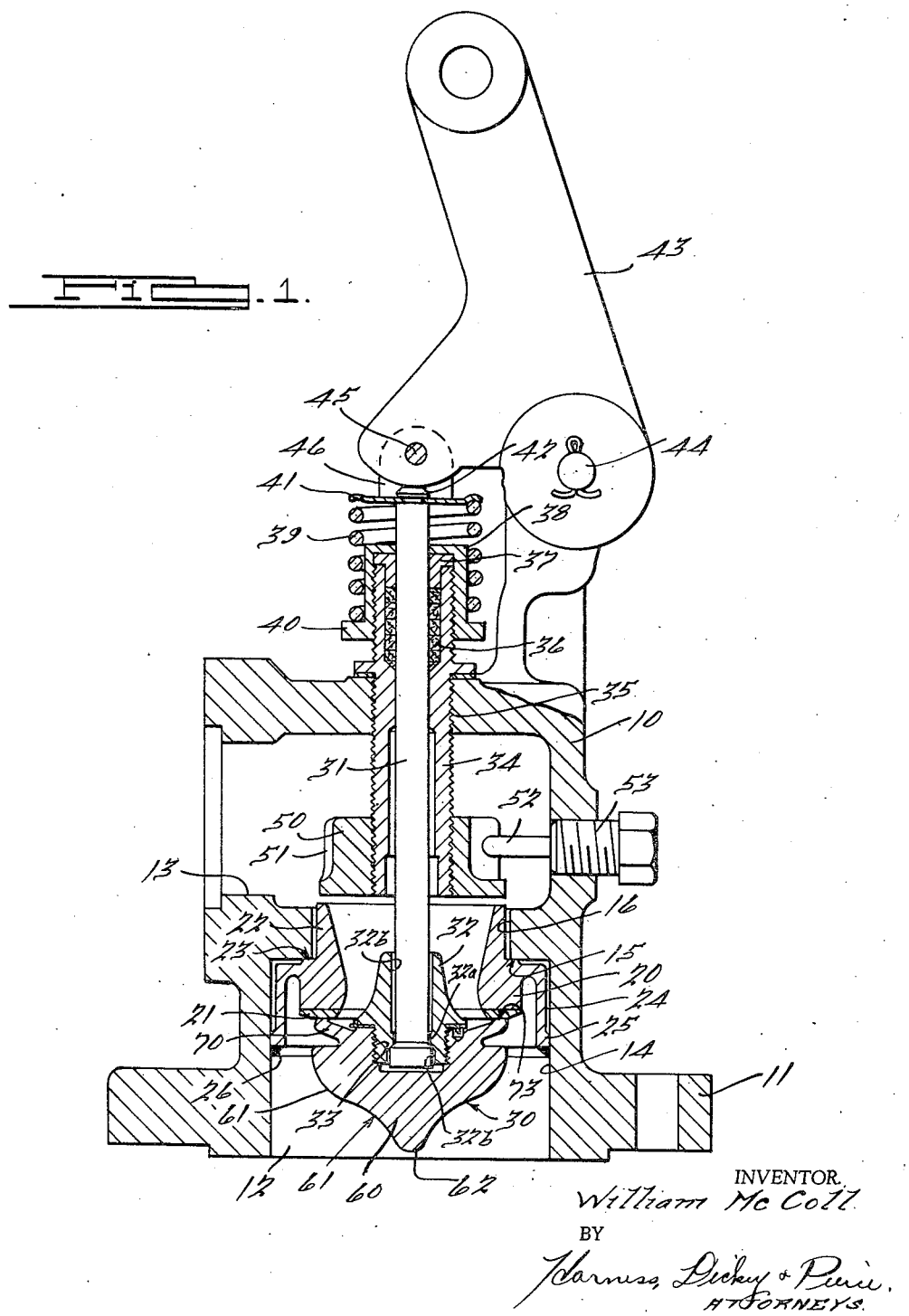
INVENTOR.
William McColl
BY
Harness, Dickey & Pierce
ATTORNEYS.

Jan. 5, 1965 W. McCOLL 3,164,364
DEFORMABLE VALVE HEAD AND SEAT CONSTRUCTION
Filed Oct. 4, 1962 2 Sheets-Sheet 2
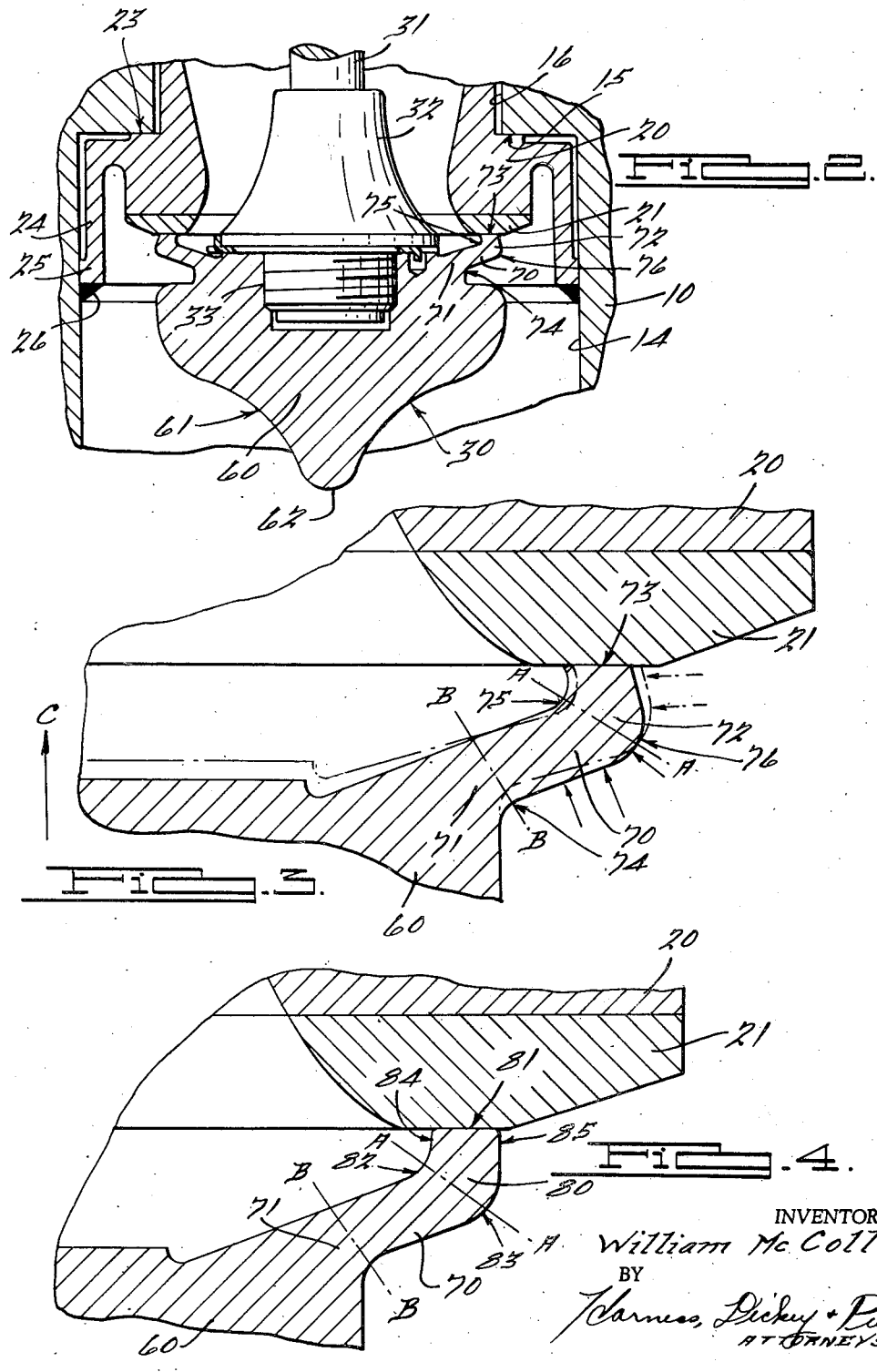
INVENTOR.
William McColl

United States Patent Office 3,164,364
Patented Jan. 5, 1965

3,164,364
DEFORMABLE VALVE HEAD AND SEAT
CONSTRUCTION
William McColl, Southampton, Hants, England, assignor to Diamond Power Specialty Corporation, Lancaster, Ohio
Filed Oct. 4, 1962, Ser. No. 228,329
6 Claims. (Cl. 251—334)

This invention relates to valves and more especially to valves of the poppet type which find particular utility in controlling the flow of stream to soot blowers and the like.

One of the important objects of this invention is to provide, in valves of this type, an improved valve disk having inherent flexing characteristics whereby sealing engagement of the valve disk with the valve seat is assured, irrespective of distortive irregularities in the valve seat, valve disk, or both.

Another object of this invention is to provide a valve disk of this type in which a part of the perpendicular force tending to seat the valve disk is transformed into a high friction force substantially parallel to the plane of the seating faces, due to the valve disk diameter tending to increase under pressure. This provides for a perfectly even contact pressure between the valve disk and valve seat under all conditions.

Still another object of the invention is to provide a valve disk having a relatively light structure in the area of the seating face thereof whereby the temperature of this part of the valve disk remains substantially that of the adjacent valve seat. This occurs because the heat path from the higher temperature body part of the valve disk to the lighter structure is relatively small. This reduces relative expansion and contraction between the valve disk and valve seat and minimizes distortive irregularities therebetween.

A further, more specific object of this invention is to provide a valve disk having a bending portion or arm extending between the contact face and the main part of the valve disk body. This bending portion or arm is in the form of an outwardly extending inclined flared portion or flange terminating in a flat contact face which engages the valve seat. The cross-sectional profile of this flange or arm is such that when the valve disk is seated, under pressure, on the valve seat, the arm flexes or bends in two planes to provide a perfectly even contact pressure between the contact face of the valve disk and the valve seat.

While not so limited, the valve disk of this invention may be used with particular advantage with the flexibly mounted valve seat shown and described in my copending application Serial Number 150,300, filed November 6, 1961.

Further objects of this invention are to provide a device of this type which is efficient, durable, compact and of simple construction, whereby it may be economically manufactured with a minimum number of machine operations.

The various objects and advantages, and the novel details of construction of one commercially practical embodiment of the invention, will become more apparent as this description proceeds, especially when considered in connection with the accompanying drawings, in which:

FIGURE 1 is a longitudinal sectional view of a soot blower steam valve embodying the valve structure of the present invention;

FIGURE 2 is an enlarged fragmentary sectional view of the valve structure showing the valve disk and valve seat more in detail;

FIGURE 3 is a further enlarged fragmentary view showing how the valve disk seats on the valve seat; and FIGURE 4 is a view somewhat similar to FIGURE 3 showing a slightly modified form of construction.

While this invention is not so limited, it is illustrated herein in one environment in which it finds particular utility. The environment illustrated consists of a soot blower steam valve which comprises a body or housing 10 having a mounting flange 11, an inlet aperture 12, and an outlet aperture 13 adapted for connection to the inlet portion of a soot blowing device (not shown). The inlet 12 comprises an annular wall 14, an annular inwardly extending shoulder 15, and an annular wall 16 of smaller diameter than the annular wall 14.

Mounted within the chamber formed by the annular walls 14 and 16 and the annular shoulder 15 is a valve seat member 20. The valve seat member 20 is provided with a hardened valve seat surface 21, preferably, although not necessarily, formed of Stellite or the like. The main body portion 22 of the valve seat member 20 extends into that portion of the chamber formed by the annular wall 16, but is spaced therefrom. The valve seat member is also provided with an annular shoulder 23 adapted to abut the annular shoulder 15 formed on the housing to locate the valve seat member in the chamber. This member 20 is also provided with an annular, relatively flexible portion 24 adapted to extend in spaced relation throughout most of its length to the annular wall 14. The relatively flexible portion 24 is provided with an outwardly extending annular rib or shoulder 25 engaging the annular wall 14 and the seat member 20 may be secured in place as, for instance, by welding, as at 26, or in any other suitable manner.

The type of valve seat member just referred to is shown and described in my copending application, Serial No. 150,300, filed November 6, 1961. While not so limited, the valve disk of the present invention may be used with particular advantage with the type of flexibly mounted valve seat shown in the above-mentioned application.

The valve disk 30 which forms the particular subject matter of this invention is secured to the lower end of a valve stem 31 by means of a nut 32 slidable over the stem 31 and threaded into the valve disk 30, as at 33. In order to permit the valve disk and nut assembly 30, 32 to tilt slightly relative to the stem 31 to compensate for any discrepancies between the seat and disk alignment, the nut 32 is provided with an annular shoulder 32a having a small clearance between it and the stem 31 and a larger clearance 32b from the shoulder 32a to the top end and the bottom end of the nut 32; see FIGURE 1. This permits the valve disk 30 to tilt slightly without binding on the valve stem 31, thus permitting the valve disk 30 to seat even though the valve seat 20, 21 is not located at exactly 90° to the axis of the valve stem 31.

The valve stem 31 is slidable within a guide 34 which is threaded into the upper wall of the housing or casing 10, as indicated at 35 and is provided with a packing 36 urged into sealing engagement with the stem 31 by means of a packing washer 37 and a packing nut 38 threadedly received on the outer end of the guide 34. A valve spring 39 engages, at one end, a flange 40 on the packing nut 38, and at its other end with a spring retainer 41 which is locked by a head 42 to the outer end of the valve stem 31. A trigger member 43 pivotally mounted on the housing 10 as at 44 is pivotally connected as at 45 to a yoke 46 secured to the spring retainer 41. With the construction just described, it will be seen that rotation of the trigger 43 in a counterclockwise direction will cause it to engage and move the stem 31 downwardly against the force of spring 39 to move the valve disk 30 off the seat 21 when it is desired to pass steam through the soot blower.

A pressure control disk 50 adjustably threaded onto the valve stem 31 is provided with a plurality of slots 51 into which the pin 52 of a lock pin plug 53 may be projected to retain the disk 50 at any adjusted position with respect to the upper end of the valve seat member 20, to define an annular outlet orifice through which the required amount of steam may pass from the inlet 12 to the outlet 13 and thus to the soot blower.

As stated at the outset, the soot blower steam valve just described constitutes but one environment in which the valve of this invention may be employed to advantage, and the present invention should not be considered as being limited to use in this particular type of construction.

The term pressure fluid or steam as used herein is intended to include saturated steam, water, gas, or any high pressure gaseous fluid, because the valve disk of this invention is adapted for use in any installation where accurate sealing between the seating faces of the valve and the valve seat is required, particularly where the fluid medium passing through the valve is at a higher temperature than the ambient atmosphere surrounding the valve body.

The valve disk 30 comprises a rigid body 60 capable of withstanding, without substantial distortion, the loads imposed thereon by the pressure fluid passing through the valve and by the spring 39. The body 60 of the valve disk is designed with an annular concavo-convex wall 61 tapered to converge into a forward apex 62. With such a configuration, the maximum amount of streamlined flow of the pressure fluid is obtained, so that the valve may be used to advantage in low pressure applications.

The seating portion of the valve disk, as shown more in detail in FIGURES 2 and 3, consists of an annular, flared flange portion 70 having a base or root portion 71 integral with the disk body 60 and a neck portion 72 provided with a substantially flat contact face 73. The root or base portion 71 of the flange 70 is provided with a curved portion 74 and the neck portion 72 is provided with inner and outer curved portions 75 and 76. The curved portions 75 and 76 of the neck portion 72 are of such an extent that the contact face 73 is located a small distance radially inwardly of the outer periphery of the valve disk and these curved portions provide a bending or flexing plane defined by the dot and dash line A—A. The curved portion 74 at the root or base 71 of the flange portion 70 provides a bending or flexing plane defined by the dot and dash line B—B.

It will be understood from an examination of FIGURE 1, that the closing force applied to the body 60 of the valve disk 30, both by the spring 39 and the force of the fluid pressure, is in an upward direction perpendicular to the valve seat, or, in other words, in the direction of the arrow C in FIGURE 3. Thus, when the contact face 73 engages the valve seat 21 and is under pressure contact therewith, the annular, flared flange portion 70 flexes or bends to present the contact face to the valve seat in a plane substantially parallel to the plane of the valve seat, or, in other words, substantially parallel to the plane of the seating faces of the valve disk and valve seat. During this pressure contact of the seating faces 73 and 21, the reversely curved portions 74 and 75–76 of the flange 70, or, in other words, the cross-sectional profile of this flange, are such as to permit this flange to bend in two planes, A—A and B—B. During this seating of the valve a part of the perpendicular force C tending to seat the valve disk is transformed into a high friction force substantially parallel to the plane of the seating faces due to the valve disk diameter tending to increase under pressure. This provides for a perfectly even contact pressure between the valve disk and the valve seat, even if small particles are trapped between the seating faces. In this connection, it is noted that the seating portion of the valve seat face 21 is of greater width than the contact face 73 of the flange 70. The manner in which the flange 70 tends to increase in diameter under pressure is suggested in an exaggerated manner by the dot and dash lines in FIGURE 3.

With the construction just described, the sealing engagement of the valve disk with the valve seat is assured, irrespective of distortive irregularities in the valve seat, valve disk, or both.

In FIGURE 4, a slightly modified form of construction is illustrated in which the neck portion 80 of the flange 70 terminates in a contact face 81. In this form of construction, the inner and outer curved portions 82 and 83 are struck from arcs of greater radii so that the walls 84 and 85 of the neck portion adjacent the contact face 81 extend substantially parallel to the central axis of the valve disk and the outer portion 85 of the neck constitutes the outer diameter of the valve disk. In this form of construction, the flange 70, which, in effect, in cross-sectional profile, constitutes a flexible arm, bends in the two planes A—A and B—B, as in the previously described construction; but, in this construction, the greatest pressure will be applied to the radially inner edge of the contact face 81.

It will be noted that in both forms of construction, the seat contacting portion of the valve disk is of relatively light construction; that is, relatively thin with respect to the body 60 of the valve disk. Thus, the heat path from the higher temperature part 60 of the valve disk to the lighter structure is relatively small, thereby permitting the temperature of the contacting portion of the valve disk to remain substantially that of the adjacent valve seat. This reduces relative expansion and contraction between the valve disk and valve seat and minimizes distortive irregularities therebetween.

While two commercially practical embodiments of the invention have been described and illustrated herein somewhat in detail, it will be understood that various changes may be made as may come within the purview of the accompanying claims.

What is claimed is:

1. In a valve having a relatively movable valve seat and valve disk, said valve disk having a relatively rigid body, that improvement which consists of an annular flange portion flared outwardly and toward said valve seat and rooted on said body and terminating in an angular portion extending toward said seat having a substantially flat contact face the plane of which is substantially perpendicular to the center axis of said valve disk, said flange portion being provided with relatively flexible bending zones adjacent its root and adjacent said contact face to permit said flange portion to bend in a plurality of planes under pressure contact with said valve seat to present said contact face thereto in a plane substantially parallel to the plane of said valve seat and to maintain a substantially uniform pressure on the surface of said contact face as said flange deforms under pressure.

2. In a valve having a relatively movable valve seat and valve disk, said valve disk having a relatively rigid body, that improvement which consists of an annular flange flared outwardly and toward said valve seat and having a root portion integral with said body and an angularly extending neck portion adjacent its outer edge generally perpendicular to said seat and provided with a substantially flat relatively wide contact face, said root and neck portions being reversely curved and sufficiently flexible to permit said flange to bend in two planes under pressure contact with said valve seat, to present said contact face to said valve seat in a plane substantially parallel to the plane of the valve seat.

3. A device as described in claim 2 in which said root portion is curved outwardly and said neck portion is curved inwardly with respect to the central axis of said valve disk.

4. In a valve having a relatively movable valve seat and valve disk, said valve disk having a relatively rigid body, that improvement which consists of an annular flange flared outwardly and toward said seat and having a root portion integral with said body and an angularly extending neck portion adjacent its outer edge generally perpendicular to said seat and provided with a substantially flat contact face, said root and neck portions being sufficiently flexible and being reversely curved to permit said flange to bend in two planes under pressure contact with said valve seat to present said contact face to said valve seat with a high friction force substantially parallel to the plane of the seating faces thereof due to the flange diameter tending to increase under said contact pressure and to maintain pressure on said contact face in a direction substantially normal to the seating faces of said seat and contact face as said flange deforms under pressure.

5. In a valve, an annular substantially flat valve seat and a valve disk having a rigid body, an annular flexible flange integral with said body, said flange comprising a first annular portion flared outwardly and toward said seat and a second annular portion extending from the outer end of said first portion, said second portion being angularly related to the first portion and being generally perpendicular to said seat, said second portion terminating in a substantially wide flat contact face substantially parallel to said seat, said flange being sufficiently flexible in the area of the junction of said first portion and said body to bend at said junction when the valve disk and seat are forced together, and said flange also being sufficiently flexible in the area of the junction of said first and second portions to enable frictional forces between said contact face and said seat, upon the forcing of said valve disk and seat together, to bend said portions relative to each other in reverse of the bending of said first portion relative to said body.

6. In a valve, an annular substantially flat valve seat and a valve disk having a substantially rigid body, an annular relatively flexible flange secured to said body, said flange comprising a first annular portion flared outwardly and toward said seat and terminating in a second annular portion, said second portion being angularly related to said first portion and extending in a direction substantially perpendicular to said seat and having a substantially wide flat contact face substantially parallel to said seat, said flange being sufficiently flexible in the area of the juncture of said first portion and said body to bend at said juncture when the valve disk and seat are forced together, and said flange also being sufficiently flexible at the juncture of said first and second portions to enable frictional forces between said contact face and said seat, upon the forcing of said valve disk and seat together, to bend said portions relative to each other to present said contact face to said seat in a plane substantially parallel to the plane of said seat.

References Cited in the file of this patent
UNITED STATES PATENTS

| | | |
|---|---|---|
| 676,580 | French | June 18, 1901 |
| 2,196,798 | Horstmann | Apr. 9, 1940 |

FOREIGN PATENTS

| | | |
|---|---|---|
| 9,020 | Great Britain | of 1899 |

UNITED STATES PATENT OFFICE
CERTIFICATE OF CORRECTION

Patent No. 3,164,364                      January 5, 1965

William McColl

It is hereby certified that error appears in the above numbered patent requiring correction and that the said Letters Patent should read as corrected below.

Column 1, line 12, for "stream" read -- steam --; column 2, line 32, for "its" read -- is --.

Signed and sealed this 1st day of June 1965.

(SEAL)
Attest:

ERNEST W. SWIDER                                   EDWARD J. BRENNER
Attesting Officer                                        Commissioner of Patents